(No Model.)

H. D. COLEMAN.
GAGE FOR DRESSING AND TRUING MILLSTONES.

No. 275,024. Patented Apr. 3, 1883.

WITNESSES
F. L. Ourand.
N. E. Oliphant.

INVENTOR
H. Dudley Coleman,
per Chas. H. Fowler,
Attorney

UNITED STATES PATENT OFFICE.

HAMILTON DUDLEY COLEMAN, OF NEW ORLEANS, LOUISIANA.

GAGE FOR DRESSING AND TRUING MILLSTONES.

SPECIFICATION forming part of Letters Patent No. 275,024, dated April 3, 1883.

Application filed December 23, 1882. (No model.)

*To all whom it may concern:*

Be it known that I, H. DUDLEY COLEMAN, a citizen of the United States, residing at New Orleans, in the parish of Orleans and State of Louisiana, have invented certain new and useful Improvements in Gages for Dressing and Truing Millstones; and I do hereby declare that the following is a full, clear, and exact description of the same, reference being had to the annexed drawings, making a part of this specification, and to the letters and figures of reference marked thereon.

Figure 1:
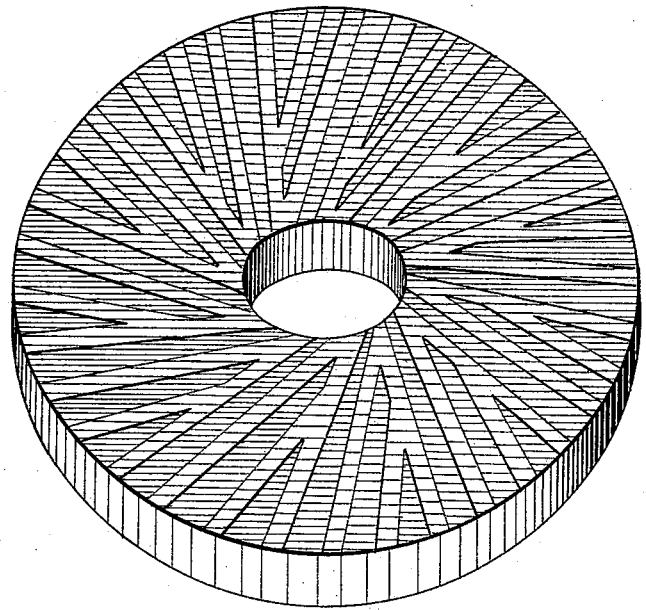
Figure 2:
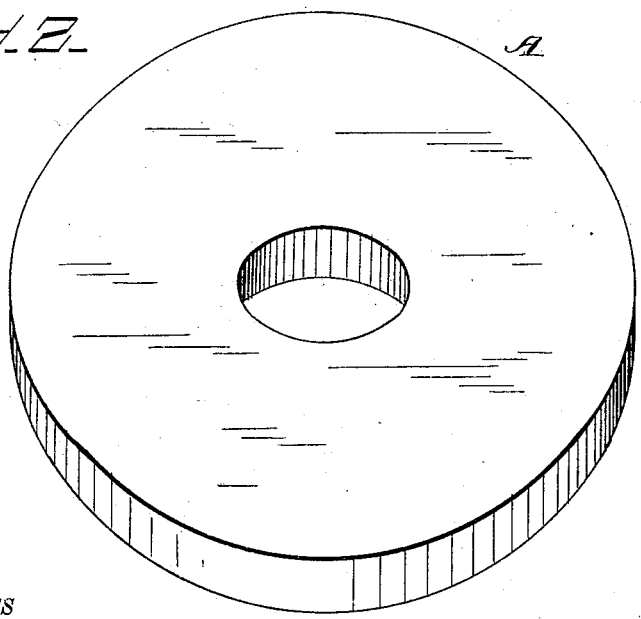

Figure 1 of the drawings is a perspective view of my invention, showing the side of the device having thereon the representation of a millstone-dress; and Fig. 2, a similar view of the reverse or opposite side thereof.

The present invention has for its object to provide a handy and convenient tool or device which will serve as a gage in dressing and truing millstones, such object being attained by a tool or device constructed substantially as shown in the drawings, and hereinafter described and claimed.

In the accompanying drawings, A represents the tool or device in the form of a plate or disk of any suitable shape and thickness, and composed of wood, stone, metal, clay, or any other suitable material, either artificial or natural.

In the drawings I have shown the tool or device preferably of circular form, and upon side thereof is put or cast, or in any manner produced, a fac-simile pattern or representation of a millstone-dress, showing the depth, number, and shape of the lands and furrows, also the drift and draft of the dress, the opposite or reverse side of the tool or device being faced up perfectly true, or as true as can be done.

In describing the use of the tool or gage for facing, dressing, and furrowing a millstone to face the stone down to a true surface, I use on the under side or true face of the tool or device A either chalk, smut, or red paint, after which the tool or device is laid on the face of the stone, and the high spots or surfaces of the stone are marked, and afterward are dressed down with a pick, when another application of coloring-matter is made on the true face of the tool or device and again placed on the face of the stone, and the high spots again faced down with a pick, this operation of testing and facing being repeated until the stone is faced down perfectly true. The other side of the tool or device A, having the dress on it, is now used as a guide or model to facilitate the inexperienced workman in dressing and furrowing the stone by having something before him to refer to and guide him as to the proper depth of furrows, width and shape of lands, &c.

If desired, the tool or device A may be provided with eyebolts screwed in it to serve as handles for convenience of the workman.

It will be seen that a very simple and convenient means is provided in the form of a tool or flat plate, which, being true on one side or face, may be used as a proof or guide to face the millstone down by, while the opposite or reverse side is provided with an exact pattern of the dress to be cut in the stone.

Having now fully described my invention, what I claim as new, and desire to secure by Letters Patent, is—

A tool or device to be used as a proof, guide, or gage for dressing and truing millstones, consisting of a plate or disk having upon one side a fac-simile pattern or representation of a millstone-dress, and its reverse side true, or nearly so, substantially as and for the purpose set forth.

In testimony that I claim the above I have hereunto subscribed my name in the presence of two witnesses.

HAMILTON DUDLEY COLEMAN.

Attest:
ANDREW HERO, Jr.,
JNO. J. WARD.